US005885020A

United States Patent [19]

Rossi

[11] Patent Number: 5,885,020

[45] **Date of Patent: *Mar. 23, 1999**

[54] MARKER PEN HAVING IMPROVED FIBROUS NIB

[75] Inventor: Robert J. Rossi, Spartanburg, S.C.

[73] Assignee: Spartan Felt Company, Inc., Spartanburg, S.C.

[ * ] Notice: This patent issued on a continued prosecution application filed under 37 CFR 1.53(d), and is subject to the twenty year patent term provisions of 35 U.S.C. 154(a)(2).

[21] Appl. No.: 559,792

[22] Filed: Nov. 15, 1995

[51] Int. Cl.[6] ................................ B43K 5/00; B32B 5/06

[52] U.S. Cl. .............................................. 401/198; 28/111

[58] Field of Search ............................. 28/111, 113, 115; 401/196, 198, 199, 200, 202, 203, 204, 205, 206, 207

[56] References Cited

U.S. PATENT DOCUMENTS

| | | | |
|---|---|---|---|
| 3,400,998 | 9/1968 | Daugherty et al. | 401/198 |
| 3,442,739 | 5/1969 | Johnson | 401/198 |
| 3,451,885 | 6/1969 | Klein | 28/111 X |
| 3,648,804 | 3/1972 | Kamp et al. | 401/199 X |
| 3,864,183 | 2/1975 | Hori | 401/198 X |
| 4,205,113 | 5/1980 | Hermansson et al. | 28/111 X |
| 4,749,618 | 6/1988 | Kawaguchi et al. | 401/199 X |
| 5,018,255 | 5/1991 | Bolliand | 28/113 X |

FOREIGN PATENT DOCUMENTS

| | | | |
|---|---|---|---|
| 50-5096 | 2/1975 | Japan | 401/198 |
| 56-30197 | 7/1981 | Japan | 401/198 |
| 2150506 | 7/1985 | United Kingdom | 401/198 |

*Primary Examiner*—D. Neal Muir
*Attorney, Agent, or Firm*—Dority & Manning, P.A.

[57] ABSTRACT

A marker pen including an improved nib. The nib has an elongated body portion and an integral tip portion. The nib is constructed of a needled nonwoven material preferably impregnated with a thermoset resin, such as melamine. The nib member may have a specific gravity generally falling within a range of 0.34 through 0.80, with a specific gravity of 0.38 being preferred in one construction. The needled nonwoven material preferably contains needle tracks characteristic of inefficient needling. A method of producing the improved nib member is also disclosed.

16 Claims, 5 Drawing Sheets

MARKER PEN HAVING IMPROVED FIBROUS NIB

BACKGROUND OF THE INVENTION

The present invention relates generally to pens utilizing fibrous nibs to wick ink onto a surface to be marked. More particularly, the invention relates to such a pen utilizing an improved fibrous nib constructed of synthetic fibers, as well as methods for producing such a nib.

Many different varieties of small marker pens are in widespread use, both in business and in the home. While these pens may occasionally utilize a nib constructed of plastic or foam, fibrous nibs are often preferred. As is well known, these nibs function to supply ink from an ink reservoir within the pen.

A number of different fibrous nibs have been developed in the past for use in small marker pens. Although often referred to as "felt" tips, these nibs are actually constructed of a variety of materials and by a variety of different methods. The specific type of nib utilized in a given application will often depend upon a number of factors, such as wick performance for a particular ink, and cost.

Generally, fibrous nibs of this type fall into three broad classes: (1) sculptured nibs constructed of wool felt; (2) die cut nibs constructed of needled polyester; and (3) sculptured nibs constructed of longitudinal fibered polyester.

(1) Wool Felt Nibs

Wool felt nibs are often characterized by a relatively high density, exhibiting a specific gravity of 0.325 or higher. Due to this relatively high density, wool felt nibs may be easily ground or cut into various shapes. For example, these nibs are often ground into a shape having a cylindrical body portion with a conical end portion tapering to a tip.

The process of making a wool felt nib begins with the production of felt. To produce the felt, a blend of wool fibers, which are generally size 64 or finer, is first carded. After carding, webs of wool fibers are generally laid upon each other to produce a batt. This combined batt constitutes felt, which is generally of the type identified by the trade style designation S-1.

The combined batt may then be hardened under a large heated platen. The platen is often attached to four columns which oscillate in an orbital pattern. This process compresses the batt, thereby hardening it as desired.

The hardened batt may then be fulled to the desired density. Fulling is a process of increasing the weight and bulk of the batt, typically by beating it in a kicker mill, or running it through a series of offset rollers. Typically, a five percent sulfuric acid solution is used as a fulling agent, along with heat and steam.

After fulling, the batt may be dried and subjected to a process referred to as "B-staging." B-staging involves first saturating the felt with a solution containing a thermoset resin, typically a melamine resin. After saturation, the resin is cured to produce relatively stiff sheets of the felt. These sheets may be pressed to control thickness, as well as to stabilize the wool against swelling when brought into contact with ink. The sheets may then be subjected to stripping, after which nibs having the desired configuration may be produced.

In part because of the relative ease with which wool felt nibs may be sculptured into various shapes, they are seen as very desirable. However, nibs produced from wool have had a tendency to be somewhat costly. Additionally, recent environmental regulations have imposed obligations which have made the process of producing wool felt nibs more difficult. These environmental regulations mandate that the sulfuric acid used as a fulling agent, as well as various lanolins and oils extracted from the wool during processing, must be disposed of in a designated manner.

Thus, despite their advantages, the use of marker pens having wool felt nibs has generally been limited to certain specialized applications in which cost is not the primary consideration. One such application is the marking of cardboard containers in an industrial shipping and receiving facility. Additionally, while wool felt nibs work well with solvent-based inks, they are not as effective in wicking water-based inks.

(2) Die-Cut Polyester Nibs

After the development of wool felt nibs, polyester nibs constructed of a needled nonwoven substrate were developed. Generally, these nibs are less expensive than wool felt nibs and work well with water-based inks. As such, these nibs are often cut into a parallelogram shape and utilized in highlighters and other low cost marker pens.

Prior art polyester nibs have generally been constructed of fibers having a size of three denier to six denier. Generally, the polyester fibers are first carded, after which a batt is produced. The batt may be produced by laying up the carded fibers using a cross lapper with a variable feed apron. The batt's weight per unit of planar area may be controlled by varying the speed of the apron.

Typically, the batt continues on an apron to a set of compression rolls, after which it may be passed between the stripper plates of a needling loom. In the needling loom, the batt is needled from both sides to entangle the polyester fibers, thus creating a nonwoven substrate material.

Next, sheets of the substrate material may be treated with an appropriate resin solution. Typically, the resin solution utilized will be a thermoset resin (such as melamine), but elastomeric resins are not uncommon for this purpose. After being treated with resin, the sheets are pressed in a manner similar to wool felt sheets.

The stiffened polyester sheets produced by this process typically had a specific gravity of approximately 0.22 to 0.28. As can be seen, this is significantly less dense than the stiffened wool sheets utilized to produce wool felt nibs. It has been very difficult to produce sculptured nibs constructed of this lower-density material. Thus, although needled polyester nibs are generally more economical than wool felt nibs, their use has typically been limited to applications in which a sculptured nib is not believed necessary.

(3) Longitudinal Fibered Nibs

Longitudinal fibered nibs were developed to pass high-pigmented inks or other fluids, and can generally be used for either solvent or water-based inks. This type of nib is typically produced utilizing polyester fibers having a size of approximately three (3) to six (6) denier. After appropriate carding, the fibers are longitudinally bundled to meet a total denier specification. In the art, a group of fibers which have been bundled in this manner is often referred to as "tow."

The tow may then be processed in a "pulltruder" device, which can be thought of as having three sections. In the first section, the tow is generally pulled through a cone-shaped heated die. The second section of the pulltruder may contain a bath of resin solution, through which the tow is passed. In the third section, the tow is dried and the resin is B-staged. The third section also generally contains a cone-shaped heated die, which finish cures the resin.

The pulltruder device produces a rigid rod which may be flat or round in cross section. These rods are relatively dense, typically having a specific gravity of greater than 0.36. As a result, the rod may be sculptured into various shapes as desired. However, because the tow is typically drawn from the pulltruder device at a speed of approximately four inches per minute, nibs produced in this manner tend to be very expensive.

SUMMARY OF THE INVENTION

The present invention recognizes and addresses the foregoing disadvantages, and others of prior art constructions and methods. Accordingly, it is an object of the present invention to provide a marker pen including an improved fibrous nib.

It is a more particular object of the present invention to provide an improved fibrous nib constructed of a synthetic material.

It is a further object of the present invention to provide an improved fibrous nib constructed of a synthetic material which may be efficiently manufactured.

It is a further object of the present invention to provide an improved fibrous nib for use in a marker pen which may be easily shaped as desired.

It is also an object of the present invention to provide a method of manufacturing articles of manufacture suitable for use as a nib of a marker pen.

It is also an object of the present invention to provide a method of manufacturing a thermoset substrate material for use in the production of an article of manufacture.

Some of these objects are achieved by an article of manufacture suitable for use as a nib of a marker pen. The article of manufacture comprises a nib member having an elongated body portion and an integral tip portion. The diameter of the nib member may preferably fall within a range of about 1–20 mm, with a particularly preferred construction having a diameter of about 6.5 mm.

The nib member is constructed of a nonwoven material of synthetic fibers preferably impregnated with a thermoset resin, such as melamine. In accordance with the invention, the nib member generally has a specific gravity of greater than 0.28. Preferably, the specific gravity will fall within a range of 0.34 through 0.80, with a specific gravity of 0.38 being preferred in an exemplary construction. The nonwoven material preferably contains needle tracks characteristic of inefficient needling, i.e., needling with relatively high gauge (relatively small) needles having two or fewer barbs.

Preferably, the synthetic fibers of the nonwoven material have a size of no greater than three denier. The synthetic fibers actually comprise fibers of multiple fiber sizes which have been blended together. For example, in an exemplary construction, 1.5 denier fibers may be blended with 2.25 denier fibers. The fibers are polyester in an exemplary construction, although other synthetic fibers, such as acrylic and nylon, may also be utilized.

According to a preferred methodology, a first step in producing the article of manufacture is the provision of an appropriate nonwoven substrate. Preferably, the nonwoven substrate is then impregnated with a stiffening resin solution. After being impregnated, the nonwoven substrate may be cured to produce a stiffened substrate material. Portions of the stiffened substrate material are then shaped to produce a plurality of nib members having an elongated body portion and an integral tip portion.

According to a preferred methodology, the nonwoven substrate is impregnated by first being at least partially immersed in a bath of water-based thermoset resin solution until it is wet throughout. Subsequently, pressure is applied to the nonwoven substrate to force out a portion of the solution therein until a total wet weight of the substrate is no more than twice a dry weight thereof. The nonwoven substrate may then be cured to produce the stiffened substrate material.

To produce the plurality of nib members, the thermoset substrate material may first be cut to form a longitudinal rod having a substantially rectangular cross section. Next, the rod may be ground to produce a substantially circular cross section. The longitudinal rod may then be further ground along the length of the rod to produce a plurality of nib members having the desired shape.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
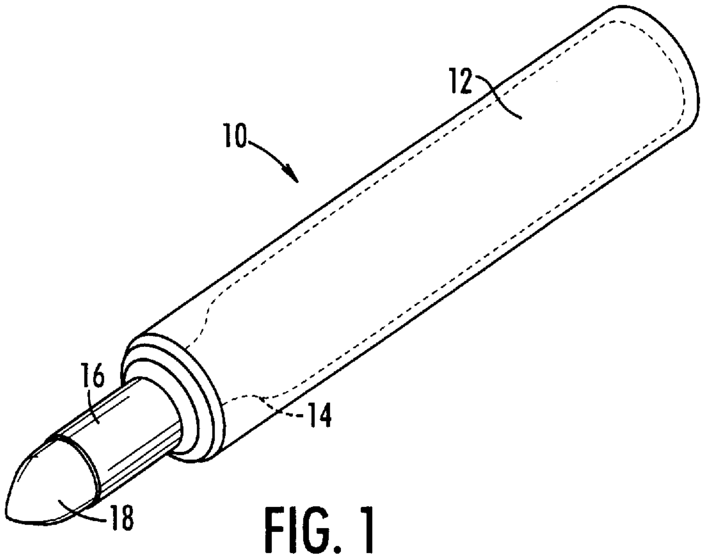
FIG. 1 is a perspective view of a marker pen incorporating an improved fibrous nib constructed according to the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a marker pen 10 constructed in accordance with the invention. Marker pen 10 includes a housing 12 which defines therein an ink reservoir diagrammatically indicated at 14. Housing 12 includes an extended portion 16 which maintains a fibrous nib member 18 in fluid communication with ink reservoir 14. As a result of this fluid communication, nib member 18 will wick ink from reservoir 14 onto a surface to be marked. In a preferred construction, pen 10 utilizes a valve which functions to release ink from reservoir 14 when the nib is pressed against a rigid surface.

Figure 2:
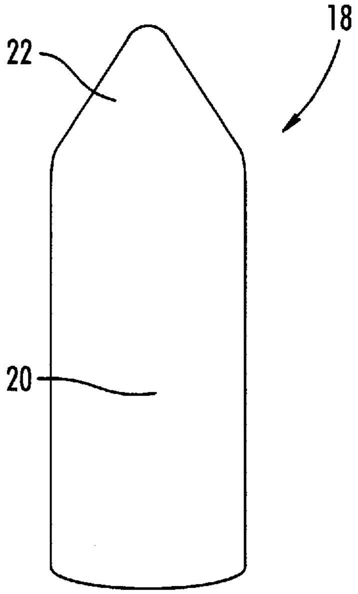
FIG. 2 is an elevation of an improved fibrous nib constructed in accordance with the present invention.

The configuration of nib member 18 may be most easily understood with reference to FIG. 2. As shown, nib member 18 is of a sculptured shape, including an elongated body portion 20 extending into an integral tip portion 22. In this case, body portion 20 is substantially cylindrical, whereas tip portion 22 is substantially conical. Preferably, the diameter of body portion will fall within a range of about one to twenty millimeters (1–20 mm), with a diameter of about 6.5 mm being particularly preferred. It should be appreciated, however, that nib member 18 may be configured into various other shapes depending upon the requirements of a particular application.

As discussed above, prior art fibrous nibs capable of being sculptured into various shapes have suffered from a number of significant disadvantages. For example, wool felt nibs have tended to be relatively expensive, as well as giving rise to various environmental concerns in their manufacture. Additionally, synthetic nibs produced by pulltrusion techniques have often been even more costly than wool felt nibs. Although materials utilized in the manufacture of die cut nibs are less expensive, the prior art has failed to provide satisfactory sculptured nibs constructed from needled nonwoven materials.

The present invention, on the other hand, provides a fibrous nib, such as nib member 18, which largely overcomes the deficiencies of the prior art. Like die cut nibs, nib member 18 is constructed of a needled nonwoven material which has been impregnated with a resin. In accordance with the present invention, however, nib member 18 has been produced to have a number of characteristics which distinguish it from the prior art. These characteristics permit nib member 18 to be readily configured into a desired shape in a manner similar to prior art sculptured nibs made from wool.

One factor which has been found particularly important in this regard is the eventual density of nib member 18. As described above, attempts to form sculptured nibs from materials used in the production of die cut polyester nibs have been largely unsuccessful. A reason for this failure has been the lower density of these materials with respect to prior art materials which were capable of being sculptured. Thus, according to the invention, nib member 18 is constructed to have a specific gravity generally exceeding 0.28. Preferably, the specific gravity will fall within a range of 0.34 to 0.80, with a specific gravity of 0.38 being preferred in an exemplary construction.

One factor that affects the density of nib member 18 is the size of the synthetic fibers making up the nonwoven substrate material. Thus, according to the invention, nib member 18 should preferably include only fibers having a size of no greater than three (3) denier. In presently preferred embodiments, a blend of fibers having different fiber sizes is utilized to construct nib member 18. For example, in an exemplary construction, web 24 may include 1.5 denier fibers and 2.25 denier fibers blended in a ratio of approximately fifty percent each.

Such a blend of fibers is desirable because the addition of lower denier fibers generally causes a concomitant increase in the density of the eventual substrate. However, higher denier fibers in the blend allow web 24 to be processed more easily than would be the case if only lower denier fibers were present. It should be appreciated that the size of the fibers in the blend will often depend upon the desired wick rate of nib member 18.

Figure 3:
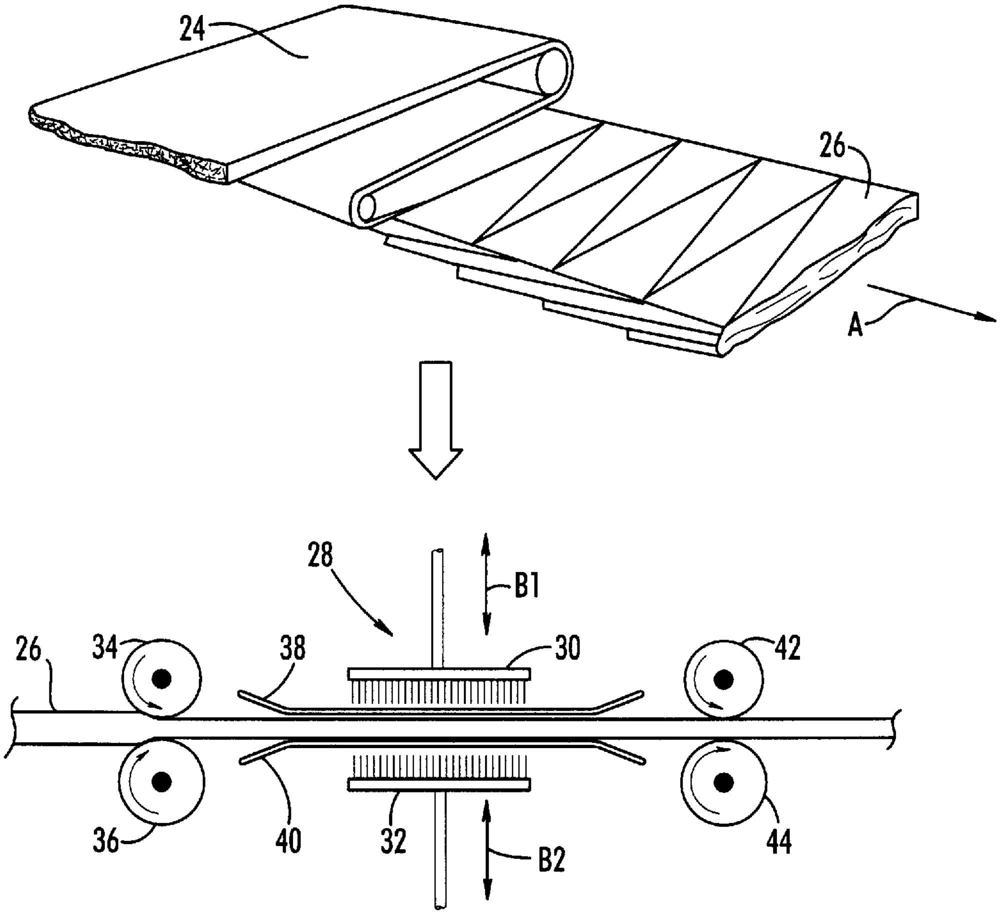
FIG. 3 diagrammatically illustrates the production of a felt-like substrate material in accordance with the present invention.

In many respects, the characteristics of nib member 18 may be most easily understood with reference to a preferred methodology by which it may be manufactured, as diagrammatically illustrated in FIGS. 3 through 9. Referring particularly to FIG. 3, the production of felt-like substrate which may be used as a base material for nib member 18 is shown. Production of this felt-like substrate may be thought of as beginning with a web 24 of synthetic fibers which have been carded to align the fibers in substantially one direction.

As shown in the top rendering of FIG. 3, web 24 may be delivered by a cross-lapper device or the like to a collector apron moving in a forward direction (as indicated by arrow A). Variation of the speed of the collector apron creates a batt 26 having a selected weight per unit of planar area.

As shown in the bottom rendering of FIG. 3, batt 26 is next passed through a needle loom generally referenced at 28. In this case, needle loom 28 has a pair of needle boards 30, 32, each of which carry a plurality of fine needles. Needles boards 30, 32 reciprocate (as shown by arrows B1 and B2) to entangle the fibers of batt 26 such that the felt-like substrate is produced.

It can be seen that batt 26 is fed into needle loom 28 utilizing a pair of feed rolls 34, 36. In addition to feeding batt 26, the feed rolls provide a degree of compression so that batt 26 may fit into the gap provided by stripper plates 38, 40. Stripper plates 38, 40 retain batt 26 in position as the needles are being withdrawn. As shown, batt 26 is delivered from needle loom 28 utilizing a pair of delivery rolls 42, 44.

In accordance with the invention, it has also been found that certain needling parameters are particularly useful in producing a fibrous nib which may be easily shaped and which has advantageous wicking characteristics. Specifically, prior art materials utilized to construct die cut polyester nibs have been characterized by relatively large needle tracks. These large needle tracks were believed desirable for providing greater entanglement to the fibers.

Figure 4A:
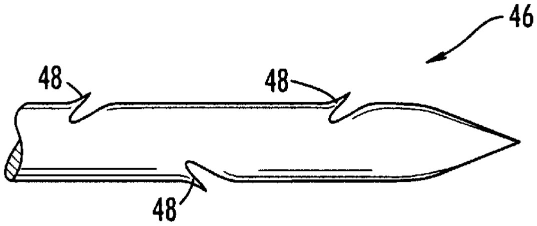
FIGS. 4A and 4B respectively illustrate a high efficiency needle and a low efficiency needle which may be utilized in a needle loom.

To produce these large needle tracks, prior art nib materials were typically produced by high efficiency needles, such as needle 46 of FIG. 4A. As shown, needle 46 has a relatively large cross section, typically of a gauge less than twenty (20) gauge. Additionally, needle 46 carries a plurality of barbs 48 (generally three or more) for engaging the fibers of the batt. The combination of relatively large cross section and multiple barbs 48 causes needle 46 to produce the relatively large needle tracks which were believed desirable.

The present invention, on the other hand, recognizes that large needle tracks may be undesirable in this application. For example, large needle tracks produce significant difficulty in shaping a nib member eventually constructed from the felt-like substrate area. Additionally, a nib member having large needle tracks will often exhibit a "fuzzy" appearance due to the large number of fibers extending transverse to its axis. Large numbers of transverse fibers will also cause undesirable wicking of ink to one side of the nib.

Figure 4B:
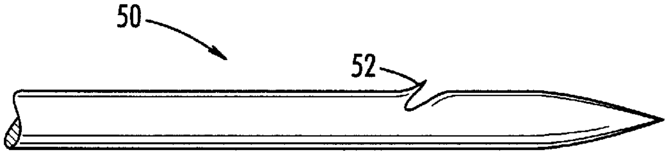

To overcome these problems of the prior art, the present invention preferably utilizes low efficiency needles, such as needle 50 of FIG. 4B. Needle 50 has a relatively small cross section, typically having a gauge greater than twenty (20) gauge, and generally carries thereon no more than two barbs. Preferably, needle 50 has a size of approximately forty (40) gauge and carries a single barb 52.

In accordance with a preferred methodology, needle boards 30 and 32 may have a needle density of approximately twenty-one (21) needles per square centimeter. Batt 26 may be intermittently advanced at a rate of 750 millimeters per minute, in one (1) millimeter increments. At each such increment, boards 30 and 32 reciprocate such that batt 26 is impacted from both sides. This type of inefficient needling is often referred to in the art as "low profile needling."

Figure 5:
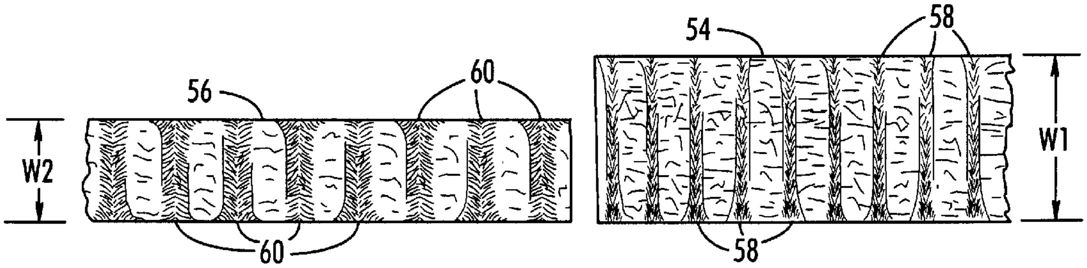
FIG. 5 illustrates a felt-like substrate of the present invention in comparison with a felt-like substrate of the type which has been used in prior art die cut polyester nibs.

FIG. 5 shows a diagrammatic comparison between a felt-like substrate 54 utilized in the present invention and a substrate 56 of the type which has been utilized to produce die cut nibs of the prior art. As can be seen, substrate 54 has needle tracks 58 which are relatively small in relation to the needle tracks 60 of substrate 56. Needle tracks 58 may not necessarily extend throughout the width of substrate 54 and, in fact, it may often be desirable that they do not.

The width W1 of substrate 54 will depend upon the size of the nib member to be produced. In many cases, a width W1 will be substantially greater than the width W2 of substrate 56. For example, if a nib member having a diameter of 6.5 mm is to be produced, the width W1 of substrate 54 may be ten (10) millimeters. The width W2 of prior art substrate 56 may generally be in a range of three (3) to five (5) millimeters.

Preferably, substrate 54 will have a weight of at least 3.2 ounces per square yard per millimeter of width. Thus, if width W1 is approximately 10 mm, then substrate 54 will preferably have a weight of at least thirty-two (32) ounces per square yard. In a preferred embodiment, substrate 54 will have a weight of approximately eighty (80) ounces per square yard. Substrate 56 will generally have a weight of approximately sixteen (16) ounces per square yard.

Figure 6:
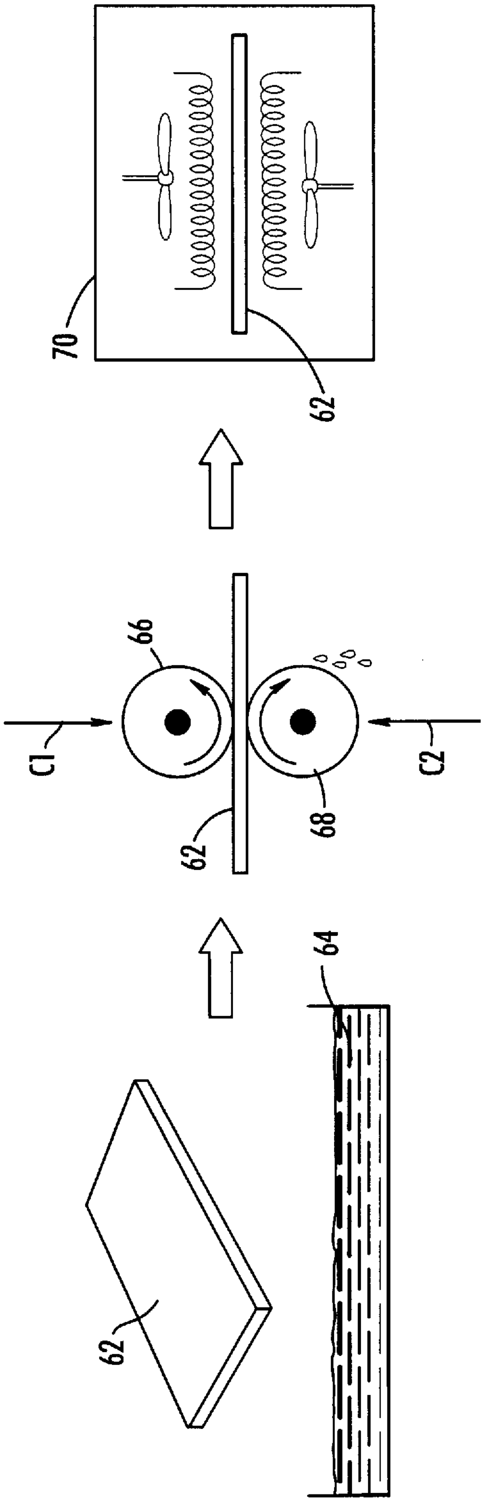
FIG. 6 diagrammatically illustrates a preferred methodology for impregnating and curing a felt-like substrate of the invention to produce a stiffened substrate.

A stiffened substrate material is then produced from substrate 54, as illustrated in FIG. 6. As shown, substrate 54 may be cut into smaller sheets, such as sheet 62, to facilitate handling. To produce the stiffened substrate material, sheet 62 is first impregnated with an appropriate resin solution, preferably a thermoset resin solution. This may be accomplished as shown by at least partially immersing sheet 62 in a bath 64 of such solution.

Preferably, bath 64 will be a water-based melamine solution. A resin bath utilizing fifty percent (50%) water and fifty percent (50%) liquid resin (urea formaldehyde melamine (80% solid)) will produce an appropriate solution for this purpose. It should be appreciated, however, that other types of solutions, such as solvent-based phenolic solutions may be also used, depending on the exigencies of a particular application.

After sheet 62 is wet throughout, it may be passed through a rotary press to remove excess solution. Such a press is diagrammatically illustrated in FIG. 6 as including a pair of rollers 66, 68 which apply a squeezing force as indicated by arrows C1 and C2. The force applied is preferably such that the wet weight of sheet 62, after pressing, will be less than twice the dry weight thereof before being immersed in bath 64. This is in contradistinction to the prior art in which the impregnated substrate would generally have a wet weight significantly greater than twice, or even three times, the weight of the dry substrate.

The greater wet weight produced according to the prior art often resulted in a problem referred to as migration, in which the resin solution would be distributed throughout the substrate in varying degrees. Migration was further exacerbated by the relatively large needle tracks of the prior art batt, which caused wide variations in capillary action throughout. As a result, varying surfaces of hardness would be experienced when attempts were made to sculpt a nib member.

After passing through the rotary press, sheet 62 is placed in an oven as generally represented at 70 to cure the resin. In accordance with a preferred methodology, such curing may be effected by maintaining sheet 62 within oven 70 for approximately two (2) hours at a temperature of approximately 150° F.

After curing, sheet 64 may be pressed to control thickness and stabilize the stiffened substrate against swelling induced by ink. In accordance with a preferred methodology, pressing at a pressure of approximately 1000 psi for a duration of approximately thirty-five (35) minutes is suitable for this purpose.

Figure 7:
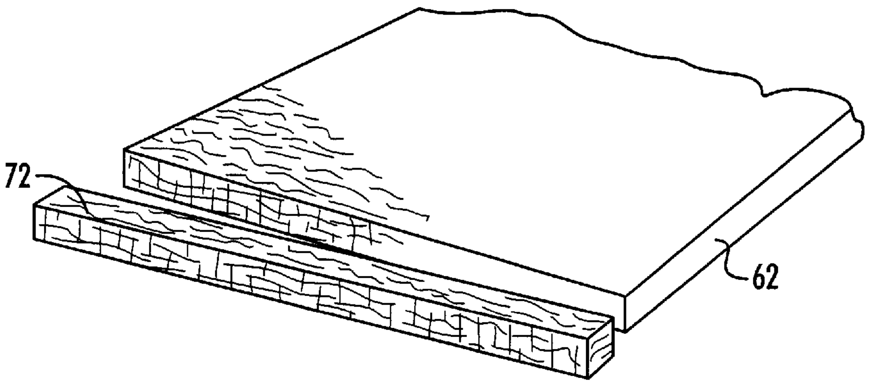
FIG. 7 illustrates a longitudinal rod having a rectangular cross section which has been cut from the stiffened substrate.
Figure 8:
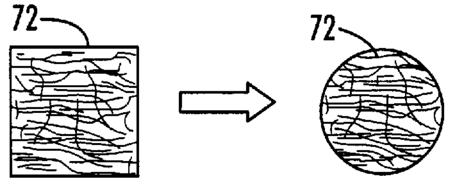
FIG. 8 diagrammatically illustrates a first grinding of the longitudinal rod of FIG. 7 to form a circular cross section.

Referring now to FIG. 7, sheet 62 may be further processed by being sliced into a plurality of longitudinal rods, such as longitudinal rod 72. Rod 72 has a substantially rectangular cross section, as best seen in the left rendering of FIG. 8. In order to produce nib members, such as nib member 18, rod 72 is preferably subjected to a first grinding wherein the corners are rounded. As a result, longitudinal rods 72 will have a substantially circular cross section, as best seen in the right rendering of FIG. 8. A dry grinding technique has been found suitable for this purpose.

Figure 9:
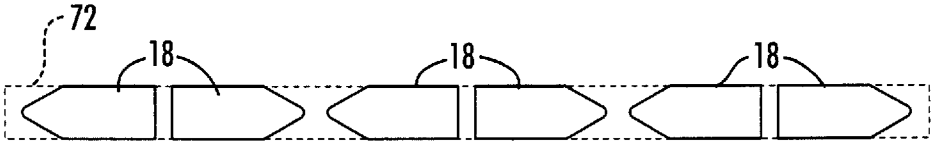
FIG. 9 diagrammatically illustrates a second grinding of the longitudinal rod to produce a plurality of nib members.

After the substantially circular cross section has been produced, rod 72 may be subjected to a second grinding in order to produce a plurality of nib members 18. Specifically, a plurality of nib members 18 may be ground in back-to-back pairs from rod 72 as shown in FIG. 9. Preferably, this is accomplished utilizing a plunge grinder in which the rod is rotated against a grinding wheel shaped to produce nib members 18. The plunge grinder preferably uses a wet grinding technique to prevent melting or burning of the nibs during the grinding process.

While presently preferred embodiments of the invention, and presently preferred methods of practicing the same, have been shown and described, it should be understood that various modifications and variations may be made thereto by those of ordinary skill in the art. In addition, it should be understood that aspects of the various embodiments and methods may be interchanged both in whole or in part. Furthermore, those of ordinary skill in the art will appreciate that the foregoing description is by way of example only, and is not intended to be limitative of the spirit and scope of the invention so further described in the following claims.

What is claimed is:

1. An article of manufacture suitable for use as a nib of a marker pen to wick ink from an ink reservoir thereof, said article of manufacture comprising:

a nib member configured by grinding to have an elongated body portion and an integral tip portion, said body portion having a diameter of no greater than approximately twenty (20) millimeters;

said nib member further constructed of a nonwoven material impregnated with a stiffening resin and having specific gravity of greater than about 0.28; and said needled nonwoven material constructed substantially entirely of synthetic fibers and having needle tracks characteristic of inefficient needling by needles as fine as at least 20 gauge.

2. An article of manufacture as set forth in claim 1, wherein said elongated body portion of said nib member has a diameter of approximately 6.5 millimeters.

3. An article of manufacture as Set forth in claim 1, wherein said nib member has a specific gravity within a range of about 0.34 through about 0.80.

4. An article of manufacture as set forth in claim 3, wherein said nib member generally has a specific gravity of 0.38.

5. An article of manufacture as set forth in claim 1, wherein said nonwoven material is constructed substantially entirely of synthetic fibers having a size of no greater than three (3) denier.

6. An article of manufacture as set forth in claim 5, wherein said synthetic fibers are polyester fibers.

7. An article of manufacture as set forth in claim 5, wherein said multiplicity of synthetic fibers comprises first synthetic fibers of a first size and second synthetic fibers of a second size different from said first size.

8. An article of manufacture as set forth in claim 7, wherein said first size is 1.5 denier and said second size is 2.25 denier.

9. An article of manufacture as set forth in claim 1, wherein said stiffening resin is a thermoset resin.

10. An article of manufacture as set forth in claim 8, wherein said thermoset resin is a melamine resin.

11. An article of manufacture as set forth in claim 1, wherein said nib member is only lightly impregnated with said stiffening resin.

12. A marker pen comprising:

a pen housing having therein an ink reservoir;

a nib member in fluid communication with said ink reservoir, said nib member configured by grinding to have an elongated body portion and an integral tip portion, said body portion having a diameter of no greater than approximately twenty (20) millimeters.

said nib member being constructed of a needled nonwoven material formed in an inefficient needling process and having needle tracks characteristic thereof, said nib member impregnated with a thermoset resin;

said needled nonwoven material being constructed substantially entirely of synthetic fibers; and said nib member generally having a specific gravity of greater than about 0.34.

13. A marker pen as set forth in claim 12, wherein said nib member generally has a specific gravity within a range of about 0.34 through about 0.80.

14. A marker pen as set forth in claim 13, wherein said nib member generally has a specific gravity of about 0.38.

15. A marker pen as set forth in claim 12, wherein substantially all of said synthetic fibers have a size of no greater than three (3) denier.

16. A marker pen as set forth in claim 12, wherein said nib member is only lightly impregnated with said thermoset resin.

* * * * *